Sept. 22, 1953 R. B. SEYMOUR 2,653,118
STRUCTURE HAVING BONDED THERETO A CORROSION RESISTANT SURFACE
Filed Feb. 1, 1951
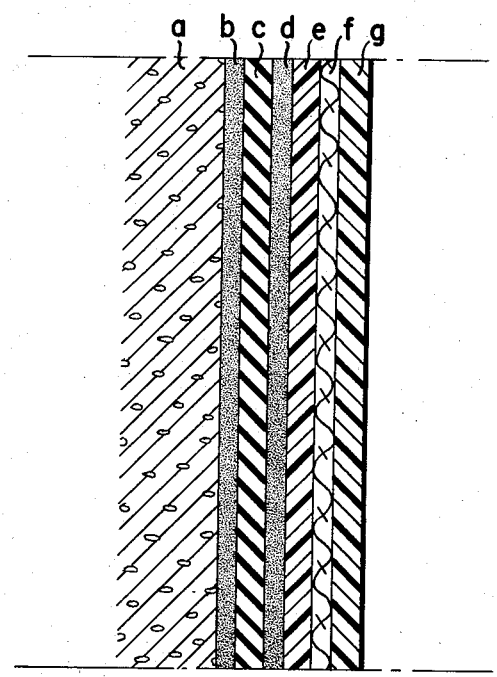
INVENTOR.
RAYMOND B. SEYMOUR
BY
ATTORNEYS.

Patented Sept. 22, 1953

2,653,118

UNITED STATES PATENT OFFICE 2,653,118

STRUCTURE HAVING BONDED THERETO A CORROSION RESISTANT SURFACE

Raymond B. Seymour, Allentown, Pa., assignor to The Atlas Mineral Products Company of Pennsylvania, Mertztown, Pa., a corporation of Pennsylvania Application February 1, 1951, Serial No. 208,919

5 Claims. (Cl. 154—43)

This invention relates to a protective surface which is adapted to be applied to a structural surface such as a floor or a tank.

The art of protecting steel, concrete or wooden structures through the application of coatings or linings is well known. However, in spite of utility, each type of coating or lining possesses well known deficiencies. For example, solution-type coatings must be built up in many multiple layers making application costs high and it is difficult to secure surfaces which are free of pin holes. Sheet linings are usually free of pin holes, but require considerable labor for application and are not homogeneous. Melt coatings such as those described in U. S. Patent 2,134,837 usually overcome some of these objections but even for low temperature service, melt linings must be protected by brick joined with corrosion resistant cements.

Additional attempts to overcome these shortcomings have been associated with fabric reinforcement of polyfurfuryl alcohol resins such as described in U. S. Patent 2,366,049. However, in spite of the good resistance to temperature and corrosion, reinforced polyfurfuryl alcohol linings are not resistant to temperature or mechanical shock and often crack in service.

An object of this invention is to provide shock resistant reinforced polyfurfuryl alcohol linings which will solve corrosion problems which cannot be overcome through the use of any other material.

Referring specifically to the drawing:

a is a concrete, steel or wood structural surface.

b is an appropriate priming system capable of joining elastomers such as neoprene or natural rubber to a.

c is made up of one or more coats of an elastomer such as neoprene or natural rubber applied as a solution or dispersion.

d is a primer capable of adhering the elastomer to polyfurfuryl alcohol.

e is a layer of carbon filled polyfurfuryl alcohol resin.

f is a reinforcing textile such as woven Fiberglas.

g refers to additional layers of carbon filled polyfurfuryl alcohol.

As mentioned above, elements d, e, f and g are fairly well known having been developed by the present applicant over ten years ago but not patented because of cracking resulting from heat and mechanical shock which severely limited the usefulness of such a construction. The introduction of a well-adhered elastomeric layer overcomes the difficulties inherent in brittle polyfurfuryl alcohol linings. For this elastomeric member to be effective, it must have an elongation under service conditions of at least 100%. The primer system, element b of Figure 1, is an extensible flexible material which would accomplish the objectives of this invention if it were extensible enough. It is also important to note that the elastomeric membrane may be present in very thin layers. An elastomer thickness of less than 1 mil is satisfactory and will accomplish the desired results but it is not the intention to limit this invention to services of minimum thickness. The ultimate thickness is limited by economics since membranes greater than 10 mils are too costly.

The utility of this invention is best shown by the following examples:

*Example 1.*—A steel tank was sand blasted and primed with a toluene solution of cyclized rubber. Freshly compounded rubber latex was sprayed on the fresh tacky primer and allowed to dry. Another coat of cyclized rubber was applied on the dry rubber latex film and after this was dry, a polyfurfuryl alcohol cement prepared in accordance with U. S. Patent 2,366,049 was brush-applied to the primed surface. An open mesh Fiberglas fabric was then embedded in the freshly applied cement and the mass allowed to set thoroughly at room temperature. Additional coats of polyfurfuryl alcohol cement were applied over the cement-textile combination.

After this lining had set hard, it was struck a sharp blow with a ten pound hammer and heated with live steam but the lining remained intact. However, when the same lining was applied in the absence of the rubber membrane, the lining cracked even when struck a light blow of the hammer or when heated above 150° F.

*Example 2.*—Example 1 was repeated except that the lining was applied on concrete rather than on steel.

*Example 3.*—Example 1 was repeated except that a neoprene solution was used rather than natural rubber and a primer system was used which was based on chlorinated rubber.

*Example 4.*—Example 3 was repeated except that the protective lining was applied on wood.

*Example 5.*—Example 1 was repeated using four layers of rubber latex.

*Example 6.*—Example 3 was repeated using six layers of neoprene.

The invention is subject to wide application to any structural surface which is required to be protected from corrosion. The scope of the in-

What is claimed is:

1. An article comprising a structure having bonded thereto a corrosion resistant surface comprising a rubber layer, a layer of polyfurfuryl alcohol resin bonded to said rubber layer by a member selected from the group consisting of cyclized rubber and chlorinated rubber, said polyfurfuryl alcohol resin having embedded therein a glass fiber fabric.

2. An article comprising a structure having bonded thereto a corrosion resistant surface comprising a rubber layer, a layer of carbon filled polyfurfuryl alcohol resin bonded to said rubber layer by a member selected from the group consisting of cyclized rubber and chlorinated rubber, said polyfurfuryl alcohol resin having embedded therein a glass fiber fabric.

3. An article comprising a structure having bonded thereto a corrosion resistant surface comprising a film formed from a member selected from the group consisting of rubber latex and neoprene, a layer of polyfurfuryl alcohol resin bonded to said film by a member selected from the group consisting of cyclized rubber and chlorinated rubber, said polyfurfuryl alcohol resin having embedded therein a glass fiber fabric.

4. An article comprising a structure having bonded thereto a corrosion resistance surface comprising a film formed from rubber latex, a layer of polyfurfuryl alcohol resin bonded to said film by a member selected from the group consisting of cyclized rubber and chlorinated rubber, said polyfurfuryl alcohol resin having embedded therein a glass fiber fabric.

5. An article comprising a structure having bonded thereto a corrosion resistant surface comprising a film formed from neoprene, a layer of polyfurfuryl alcohol resin bonded to said film by a member selected from the group consisting of cyclized rubber and chlorinated rubber, said polyfurfuryl alcohol resin having embedded therein a glass fiber fabric.

RAYMOND B. SEYMOUR.

References Cited in the file of this patent

UNITED STATES PATENTS

| Number | Name | Date |
| --- | --- | --- |
| 2,211,959 | Maney | Aug. 20, 1940 |
| 2,278,777 | Garvey | Apr. 7, 1942 |
| 2,366,049 | Payne et al. | Dec. 26, 1944 |
| 2,370,913 | Procter | Mar. 6, 1945 |
| 2,386,112 | Harkins | Oct. 2, 1945 |
| 2,439,562 | Cunningham | Apr. 13, 1948 |
| 2,462,054 | Delmonte | Feb. 22, 1949 |
| 2,471,600 | Adams et al. | May 31, 1949 |
| 2,471,905 | Smith | May 31, 1949 |
| 2,502,406 | Entwistle | Mar. 28, 1950 |